United States Patent
Miura et al.

(10) Patent No.: US 10,180,672 B2
(45) Date of Patent: Jan. 15, 2019

(54) DEMAND CONTROL DEVICE AND COMPUTER READABLE MEDIUM

(71) Applicant: Mitsubishi Electric Corporation, Tokyo (JP)

(72) Inventors: Kenjiro Miura, Tokyo (JP); Fuyuki Sato, Tokyo (JP); Kosuke Iwasaki, Tokyo (JP); Kazumi Ueno, Tokyo (JP); Kazuo Tomisawa, Tokyo (JP); Sosuke Minamida, Tokyo (JP); Toshihiro Mega, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 148 days.

(21) Appl. No.: 15/116,681

(22) PCT Filed: Nov. 20, 2014

(86) PCT No.: PCT/JP2014/080709
§ 371 (c)(1),
(2) Date: Aug. 4, 2016

(87) PCT Pub. No.: WO2015/122074
PCT Pub. Date: Aug. 20, 2015

(65) Prior Publication Data
US 2016/0349725 A1 Dec. 1, 2016

(30) Foreign Application Priority Data
Feb. 14, 2014 (JP) .................................. 2014-026064

(51) Int. Cl.
*F24F 11/30* (2018.01)
*G05B 19/042* (2006.01)
(Continued)

(52) U.S. Cl.
CPC ............ *G05B 19/042* (2013.01); *F24F 11/30* (2018.01); *F24F 11/62* (2018.01); *G05B 11/01* (2013.01);
(Continued)

(58) Field of Classification Search
None
See application file for complete search history.

(56) References Cited

U.S. PATENT DOCUMENTS

| 2008/0178615 | A1* | 7/2008 | Yoon | ......................... F24F 3/06 62/79 |
| 2012/0101652 | A1* | 4/2012 | Shin | ......................... H02J 3/14 700/296 |

FOREIGN PATENT DOCUMENTS

| EP | 1944559 A1 | 7/2008 | |
| EP | 1950504 A2 * | 7/2008 | ................ F24F 3/06 |

(Continued)

*Primary Examiner* — Isaac T Tecklu
(74) *Attorney, Agent, or Firm* — Birch, Stewart, Kolasch & Birch, LLP (57) ABSTRACT

There is provided air-conditioning control in a low power operation so as not to exceed a target demand power amount in a predetermined measurement period while preventing deterioration of comfortableness of a living space. There include a reducible-power-amount estimation unit configured to calculate, for each group, a reducible power amount by making indoor units perform, for each group, a shut-off operation for a minimum shut-off time in the first half of a demand time limit, and a reduced-power-amount determination unit configured to distribute, when a power consumption amount predicted by a power consumption amount prediction unit exceeds a target demand power amount after the first half of the demand time limit passes, the exceeding power amount to each zone, evenly distribute, in each zone, the distributed power amount to each group, and calculate, based on the reducible power amount of each group, a (Continued)

shut-off time of each group when each group performs the shut-off operation to reduce the distributed power amount.

7 Claims, 9 Drawing Sheets

(51) Int. Cl.
| | |
|---|---|
| *F24F 11/62* | (2018.01) |
| *H02J 3/14* | (2006.01) |
| *G05B 11/01* | (2006.01) |
| *G05B 13/02* | (2006.01) |
| *H02J 4/00* | (2006.01) |
| *F24F 11/63* | (2018.01) |
| *F24F 140/50* | (2018.01) |
| *F24F 11/46* | (2018.01) |
| *F24F 11/65* | (2018.01) |
| *F24F 110/00* | (2018.01) |
| *F24F 140/60* | (2018.01) |
| *H02J 3/00* | (2006.01) |
| *F24F 130/00* | (2018.01) |
| *F24F 130/10* | (2018.01) |
| *F24F 11/61* | (2018.01) |
| *F24F 11/47* | (2018.01) |

(52) U.S. Cl.
CPC .............. *G05B 13/021* (2013.01); *H02J 3/14* (2013.01); *H02J 4/00* (2013.01); *F24F 11/46* (2018.01); *F24F 11/47* (2018.01); *F24F 11/61* (2018.01); *F24F 11/63* (2018.01); *F24F 11/65* (2018.01); *F24F 2110/00* (2018.01); *F24F 2130/00* (2018.01); *F24F 2130/10* (2018.01); *F24F 2140/50* (2018.01); *F24F 2140/60* (2018.01); *G05B 2219/35212* (2013.01); *G05B 2219/35215* (2013.01); *H02J 2003/003* (2013.01); *H02J 2003/143* (2013.01); *Y02B 70/3225* (2013.01); *Y02B 70/3266* (2013.01); *Y02B 70/3275* (2013.01); *Y02P 80/14* (2015.11); *Y04S 20/222* (2013.01); *Y04S 20/242* (2013.01); *Y04S 20/244* (2013.01)

(56) References Cited

FOREIGN PATENT DOCUMENTS

| | | |
|---|---|---|
| JP | 2008-170141 A | 7/2008 |
| JP | 2014-3727 A | 7/2008 |
| JP | 4548455 B2 | 9/2010 |
| JP | 4552119 B2 | 9/2010 |

\* cited by examiner

AIR-CONDITIONING FACILITY INFORMATION

| ZONE | OUTDOOR UNIT | WATTMETER | GROUP | REDUCIBLE POWER AMOUNT | INDOOR UNIT |
|---|---|---|---|---|---|
| A | A | ATTACHED | A1 | | A11 |
| | | | | | A12 |
| | | | A2 | | A21 |
| | | | | | A22 |
| B | B | NOT ATTACHED | B1 | | B11 |
| | | | | | B12 |
| | | | B2 | | B21 |
| | | | | | B22 |

DEMAND CONTROL DEVICE AND COMPUTER READABLE MEDIUM

TECHNICAL FIELD

The present invention relates to a demand control device and a program, and particularly relates to air-conditioning control using an intermittent shut-off operation.

BACKGROUND ART

A company having a demand contract with a power company performs demand management so as not to exceed maximum demand power (a demand value). The demand contract is a contract in which an upper limit of a power consumption amount for each period, which is called a demand time limit, is defined as the maximum demand power. In order to reduce a power consumption amount (an integrated value) in the demand time limit (for example, for 30 minutes) so as not to exceed the maximum demand power, an electrical facility needs to be operated with low power, and as a technique for that, there is an technique called an intermittent shut-off operation or rotation operation (hereinafter, collectively referred to as an "intermittent shut-off operation") of an air-conditioning indoor unit. The intermittent shut-off operation is an air-conditioning control method in which power consumption amount is to be reduced by suspending in order a plurality of indoor units for a certain period of time instead of continuously operating them, that is, by performing a so-called thinning operation.

For example, Patent Literature 1 proposes a technique in which a power consumption amount for an initial period in a demand time limit is calculated while external factors, such as an outside air temperature and a solar radiation amount measured N hours before the demand time limit are taken into consideration, the power consumption amount for the remaining time in the same demand time limit is predicted from the calculated power consumption amount, then, when it is predicted that the power consumption in the demand time limit exceeds the maximum demand power, a power amount to be reduced is calculated, and a shut-off time of an electric device is calculated based on the calculated power amount which is a reduction target.

CITATION LIST

Patent Literature

Patent Literature 1: JP 4552119 B
Patent Literature 2: JP 2008-170141 A

SUMMARY OF INVENTION

Technical Problem

However, in Patent Literature 1, although external factors, such as an outside air temperature and a solar radiation amount, are taken into consideration when a power consumption amount is predicted, a constant is used for a calculation expression for a power amount to be reduced. Furthermore, a solar radiation amount and the like measured N hours before a demand time limit are used. Moreover, an indoor temperature to be set can be changed according to the number of persons in a room. As described above, in Patent Literature 1, errors can easily occur when external conditions, such as weather, and indoor conditions are constantly changed, and an intermittent shut-off operation is not necessarily controlled while a comfortable indoor environment is maintained.

An object of the present invention is to perform air-conditioning control in a low power operation so as not to exceed a target demand power amount in a predetermined measurement period while preventing deterioration of comfortableness of a living space.

Solution to Problem

A demand control device according to the present invention includes: air-conditioning control means to perform low power operation control to make a group to which one or more indoor units belong perform a low power operation on a per-group basis; estimation means to estimate, as reducible power of the group, power calculated from a power amount reduced when each group separately performs the low power operation for a predetermined measurement unit time in a predetermined measurement period from a start point of a demand time limit; prediction means to predict a power consumption amount at an end point of the demand time limit; and calculation means to calculate, when the power consumption amount predicted by the prediction means exceeds a target demand power amount previously set to the demand time limit, a power amount to be reduced in order not to exceed the target demand power amount as a target reduced power amount, distribute the target reduced power amount to each group according to previously set distribution criteria, and calculate, for each group, a low power operation time to reduce the target reduced power amount distributed for each group based on the reducible power, and the air-conditioning control means makes the group perform the low power operation for the low power operation time calculated for each group by the calculation means before the end point of the demand time limit after the predetermined measurement period passes.

Further, power consumption measurement means, which is attached to an inverter type outdoor unit connected with the indoor unit which belongs to one or more groups, to measure a power consumption of the outdoor unit, is included, and the estimation means estimates, based on, when any one of groups performs the low power operation, the power consumption measured by the power consumption measurement means attached to the outdoor unit connected with the indoor unit which belongs to the group, a reducible power amount of the group.

Further, the estimation means estimates, from, when any one of groups performs the low power operation, operation frequency of a compressor of the outdoor unit connected with the indoor unit which belongs to the group, power consumption of the group, and estimates a reducible power amount of the group based on the estimated power consumption.

Further, the estimation means generates a correlation model based on actual result information on the operation frequency and the power consumption of the compressor, and estimates a power consumption amount of the group from the correlation model.

Further, the calculation means evenly distributes the calculated target reduced power amount to each group according to the previously set distribution criteria.

Further, the calculation means distributes, when the indoor units are grouped into a plurality of groups based on an installation place and each group is allocated to any one of a plurality of areas, the target reduced power amount to each area, distributes, to each group allocated to the area, the target reduced power amount distributed to each area, and calculates, for each group, the low power operation time to reduce the distributed target reduced power amount for each group based on the reducible power.

Further, the calculation means evenly distributes the target reduced power amount to each area.

A program according to the present invention causes a computer mounted in a demand control device to function as: air-conditioning control means to perform low power operation control to make a group to which one or more indoor units belong perform a low power operation on a per-group basis; estimation means to estimate, as reducible power of the group, power calculated from a power amount reduced when each group separately performs the low power operation for a predetermined measurement unit time in a predetermined measurement period from a start point of a demand time limit; prediction means to predict a power consumption amount at an end point of the demand time limit; and calculation means to calculate, when the power consumption amount predicted by the prediction means exceeds a target demand power amount previously set to the demand time limit, a power amount to be reduced in order not to exceed the target demand power amount as a target reduced power amount, distribute the target reduced power amount to each group according to previously set distribution criteria, and calculate, for each group, a low power operation time to reduce the target reduced power amount distributed for each group based on the reducible power, and the air-conditioning control means makes the group perform the low power operation for the low power operation time calculated for each group by the calculation means before the end point of the demand time limit after the predetermined measurement period passes.

Advantageous Effects of Invention

According to the present invention, it is possible to perform air-conditioning control in a low power operation so as not to exceed a target demand power amount while preventing deterioration of comfortableness of each air-conditioning space.

DESCRIPTION OF EMBODIMENTS

Hereinafter, suitable embodiments of the present invention will be described with reference to the drawings.

First Embodiment

Figure 1:
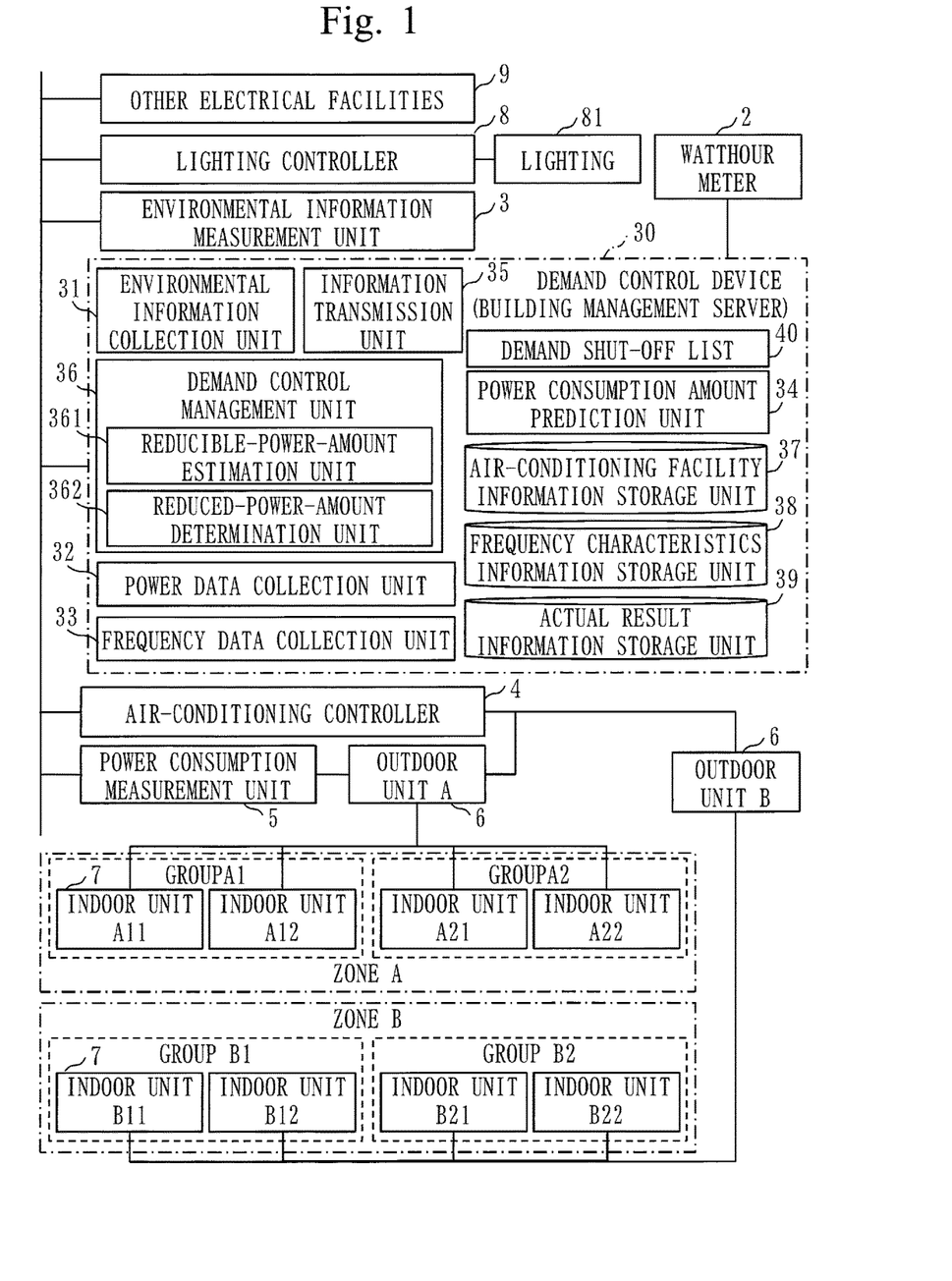
FIG. 1 is a diagram illustrating an entire and block configuration of a building management system having an embodiment of a demand control device according to the present invention.

FIG. 1 is a diagram illustrating an entire and block configuration of a building management system having an embodiment of a demand control device according to the present invention. FIG. 1 illustrates a configuration in which an environmental information measurement unit 3, a demand control device 30, an air-conditioning controller 4, a power consumption measurement unit 5, a lighting controller 8, and other electrical facilities 9 are connected with a network 1. The devices 3 to 5, 8, 9, and 30 exchange data and information, such as control and instructions, via the network 1. The environmental information measurement unit 3 is means to acquire, by measurement, information indicating environments surrounding a building which is a management target, and is implemented by various sensors and the like. The present embodiment is a technology suitable for an air-conditioning facility in electrical facilities which are demand management targets, and the environmental information measurement unit 3 acquires, for example, an outside air temperature, a solar radiation amount, and the like as environmental information related to air-conditioning, particularly as information related to variation factors of thermal load of the air-conditioning facility. The demand control device 30 is included in a building management server which manages the entire building management system, is a main control device used to perform the demand management based on measurement values and the like by a connected watthour meter 2, and is a device to perform characteristic air-conditioning control in the present embodiment. Obviously, the demand control device 30 may not be included in the building management server and may be configured as an independent device. The air-conditioning controller 4 is a controller which performs action control of a connected air-conditioning facility under the control of the demand control device 30. The air-conditioning controller 4 in the present embodiment is connected with two outdoor units 6. The power consumption measurement unit 5 is provided as power consumption measurement means, and is implemented by a wattmeter which measures the power consumption of the outdoor unit 6 to which it is attached. In the present embodiment, it is assumed that the power consumption measurement unit 5 is attached only to an outdoor unit A. The lighting controller 8 controls lighting 81 installed in the building. The other electrical facilities 9 are facilities, other than the air-conditioning facility and the lighting facility, which consume electricity.

Each of a plurality of indoor units 7 installed in living spaces in the building is connected to an outdoor unit 6. In the present embodiment, a group of indoor units may be allocated to an area, such as a north side or a south side on the same floor, where change of a room temperature is different from another area according to a solar radiation amount or an outside air temperature. The indoor units 7 in the present embodiment are included in either of two areas A and B (hereinafter, referred to as a "zone") as illustrated in FIG. 1, and categorized into two groups A1 and A2 in the zone A, and two groups B1 and B2 in the zone B. A group is a unit to perform an intermittent shut-off operation. In the present embodiment, the case where intermittent shut-off operation control is performed as an example of a low power operation will be exemplified. Here, the intermittent shut-off operation is the same as a shut-off operation in the present embodiment, and means that (groups of) the indoor units 7 operate with low load (low power) by performing a suspending operation or an air blowing operation, and the like. Note that, the low load (low power) operation is not necessarily limited to the operation in which the outdoor unit 6 is completely suspended, and includes an operation in which the outdoor unit 6 operates with lower power than normal power by turning a thermostat off or changing a temperature.

Note that, each number of air-conditioning controllers 4, outdoor units 6 connected with the air-conditioning controller 4, indoor units 7 connected with the outdoor units 6, zones, groups included in the zones, groups, indoor units 7 included in the groups which are illustrated in FIG. 1 is an example and is not necessarily limited to the number.

Figure 2:
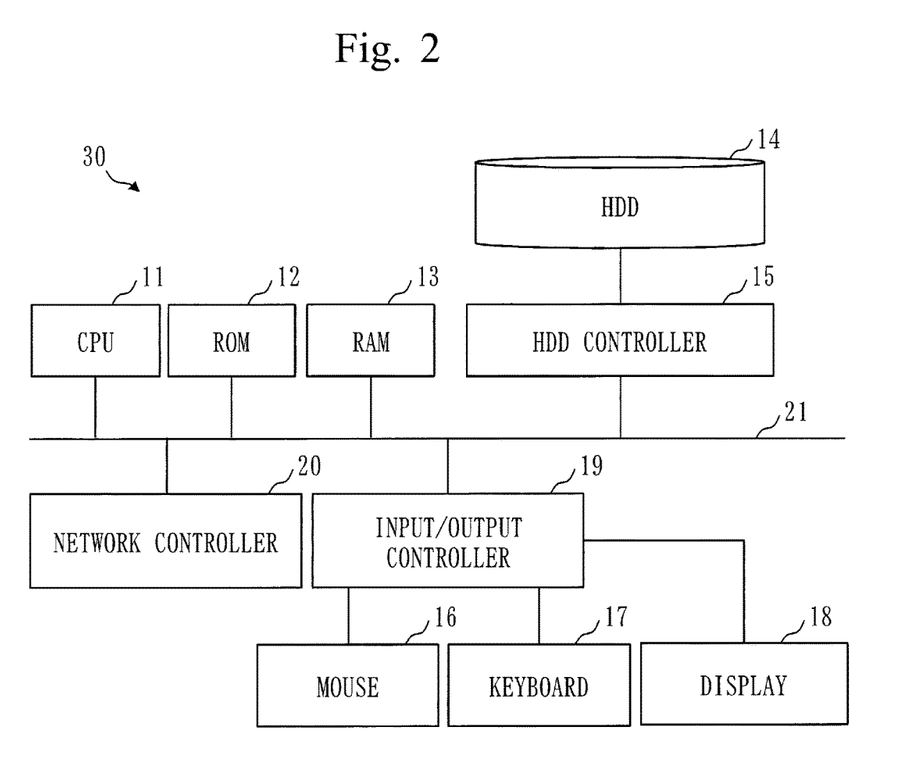
FIG. 2 is a hardware configuration diagram of a computer forming a demand control device in a first embodiment.

FIG. 2 is a hardware configuration diagram of a computer forming the demand control device 30 in the present embodiment. In the present embodiment, a computer forming the demand control device 30 can be implemented by an existing general hardware configuration. That is, as illustrated in FIG. 2, the computer is configured by connecting, with an internal bus 21, a CPU 11, a ROM 12, a RAM 13, a hard disk drive (HDD) controller 15 connected with an HDD 14, an input/output controller 19 connected with a mouse 16 and a keyboard 17 which are provided as input means and a display 18 provided as a display device, and a network controller 20 provided as communication means.

Although a configuration, such as a mouse connected with the input/output controller 19, may not be normally provided in the air-conditioning controller 4, the air-conditioning controller 4 incorporates a computer and has a configuration similar to FIG. 2.

Returning back to FIG. 1, the demand control device 30 in the present embodiment includes an environmental information collection unit 31, a power data collection unit 32, a frequency data collection unit 33, a power consumption amount prediction unit 34, an information transmission unit 35, a demand control management unit 36, an air-conditioning facility information storage unit 37, a frequency characteristics information storage unit 38, an actual result information storage unit 39, and a demand shut-off list 40. Note that, constituent elements, which implement conventionally mounted functions as the demand control device 30 but are not used for the description in the present embodiment, have been omitted from FIG. 1.

The environmental information collection unit 31 is provided as acquisition means, and collects, via the network 1, environmental information measured by the environmental information measurement unit 3. The power data collection unit 32 collects, via the network 1, power consumption measured by the power consumption measurement unit 5. The outdoor unit 6 is a heat pump air-conditioner, and performs cooling and heating by rotating a compressor. At this time, the outdoor unit 6 records the operation frequency of the compressor. The frequency data collection unit 33 collects the operation frequency data of the outdoor unit 6 via the air-conditioning controller 4 and the network 1. The power consumption amount prediction unit 34 is provided as prediction means, inputs a measurement value by the watt-hour meter 2, and predicts a power consumption amount at the end point of a demand time limit from the actual result of the power consumption amount from the start point of the demand time limit to the present point in the demand time limit. The method for calculating the predicted power consumption amount may be the same as conventional ones. The power consumption amount prediction unit 34 basically predicts the power consumption amount based on the correlation between the operation frequency and the power of the outdoor unit. As data indicating the correlation between the operation frequency and the power, for example, a catalogue value may be used. When it is difficult to suppress the power consumption below the target demand power only with the low power operation of the air-conditioning facility, the information transmission unit 35 notifies the building management server of the situation related to the demand control in the demand control device 30.

The demand control management unit 36 includes a reducible-power-amount estimation unit 361 and a reduced-power-amount determination unit 362, and performs the demand management by entire control of the air-conditioning control and the like while performing the action controls of the other constituent elements 31 to 35. The demand control management unit 36 in the present embodiment is provided as air-conditioning control means, and performs the intermittent shut-off operation control in which a group unit to which one or more indoor units 7 belong performs the shut-off operation. Furthermore, the reducible-power-amount estimation unit 361 is provided as estimation means, and estimates, as the reducible power of the group, the power calculated from the reduced power amount when each group separately performs the shut-off operation for a predetermined shut-off unit time in a predetermined measurement period from the start point of the demand time limit. The reduced-power-amount determination unit 362 is provided as calculation means, calculates, when the power consumption amount predicted by the power consumption amount prediction unit 34 exceeds a target demand power amount previously set to the demand time limit, the power amount to be reduced in order not to exceed the target demand power amount as a target reduced power amount, distributes the target reduced power amount to each group according to previously set distribution criteria, and calculates, for each group, a shut-off time to reduce the distributed target reduced power amount for each group based on the reducible power amount. In the present embodiment, as the previously set distribution criteria, the case where the target reduced power amount is evenly distributed to each group will be exemplified.

In the frequency characteristics information storage unit 38, frequency characteristics information, which is used when the power consumption amount of the group is estimated, when any one of the groups performs the shut-off operation, from the operation frequency of the outdoor unit 6 connected with the indoor unit 7 which belongs to the group, is stored. The frequency characteristics information may be previously set according to a catalogue value or the like, or may be learnt from an actual result value and set. As an example of learning and setting, for example, a model (FIG. 7) generated by correcting a catalogue value according to the relation between the power and the operation frequency measured at the outdoor unit A may be used (it is available when the outdoor unit A and an outdoor unit B are the same model). The frequency characteristics information will be described together with the description for actions. In the actual result information storage unit 39, actual result information related to power consumption is accumulated. Specifically, a date and time when power is consumed, the power consumption (kW) of each outdoor unit 6 at the date and time, and environmental information, such as the outside air temperature, the solar radiation amount, and the like, is accumulated.

Figure 3:
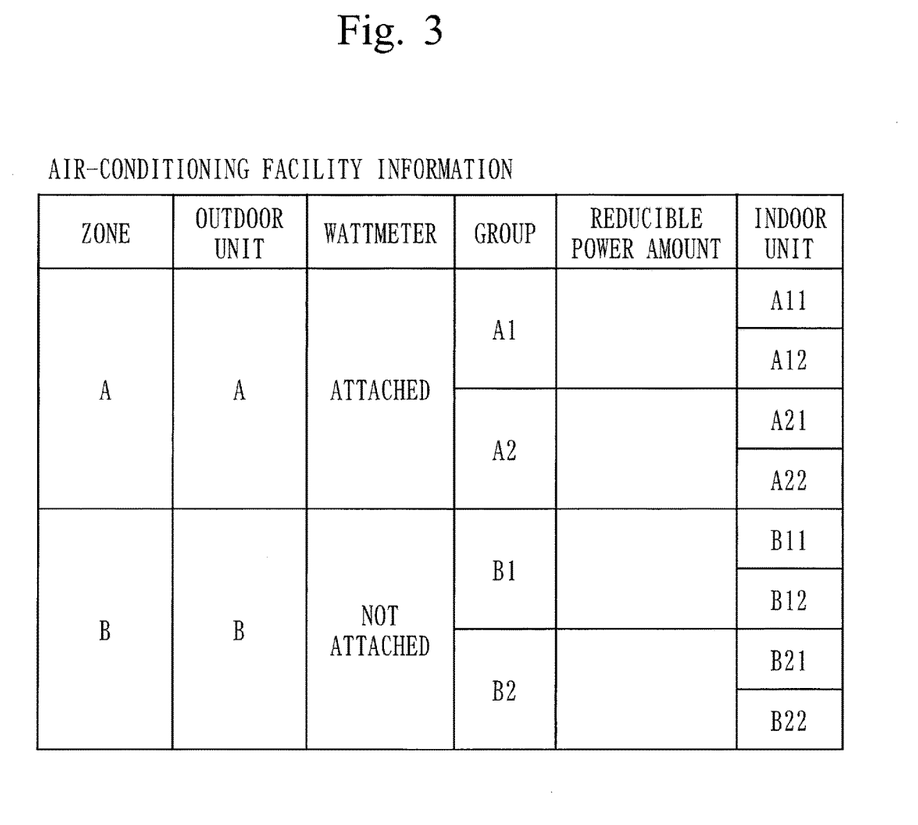
FIG. 3 is a diagram illustrating an example of a data configuration of air-conditioning facility information stored in an air-conditioning facility information storage unit in the first embodiment.

FIG. 3 is a diagram illustrating an example of a data configuration of air-conditioning facility information stored in the air-conditioning facility information storage unit 37 in the present embodiment. The air-conditioning facility information includes the items of, in addition to the correspondence relation of the zone, the outdoor unit 6, the group, and the indoor unit 7 in the air-conditioning facility, a "wattmeter" to set whether a wattmeter (the power consumption measurement unit 5) is attached to the outdoor unit 6, and a "reducible power amount" to store the reducible power amount estimated by the reducible-power-amount estimation unit 361. Item values based on the device configuration illustrated in FIG. 1 are set to the air-conditioning facility information illustrated in FIG. 3.

Whereas the air-conditioning facility information storage unit 37 stores the facility information limited to the air-conditioning, the demand shut-off list 40 includes the facility information on the facility other than the air-conditioning. The data configuration depends on the characteristics of the facility, and includes a zone where each facility is installed, a belonging group, a reducible power amount, a shut-off priority, and the like.

The constituent elements 31 to 36 in the demand control device 30 are each implemented by a cooperative action of the computer forming the demand control device 30 and a program which runs in the CPU 11 mounted in the computer. Furthermore, the storage units 37 to 40 are each implemented by the HDD 14 mounted in the demand control device 30. Alternatively, the RAM 13 or external storage means may be used via the network 1.

Furthermore, the program used in the present embodiment can be provided by communication means and also provided by being stored in a computer-readable recording medium, such as a CD-ROM or a DVD-ROM. The program provided from the communication means or the recording medium is installed in the computer and sequentially executed by the CPU of the computer, and thus various processes are implemented.

Figure 4A:
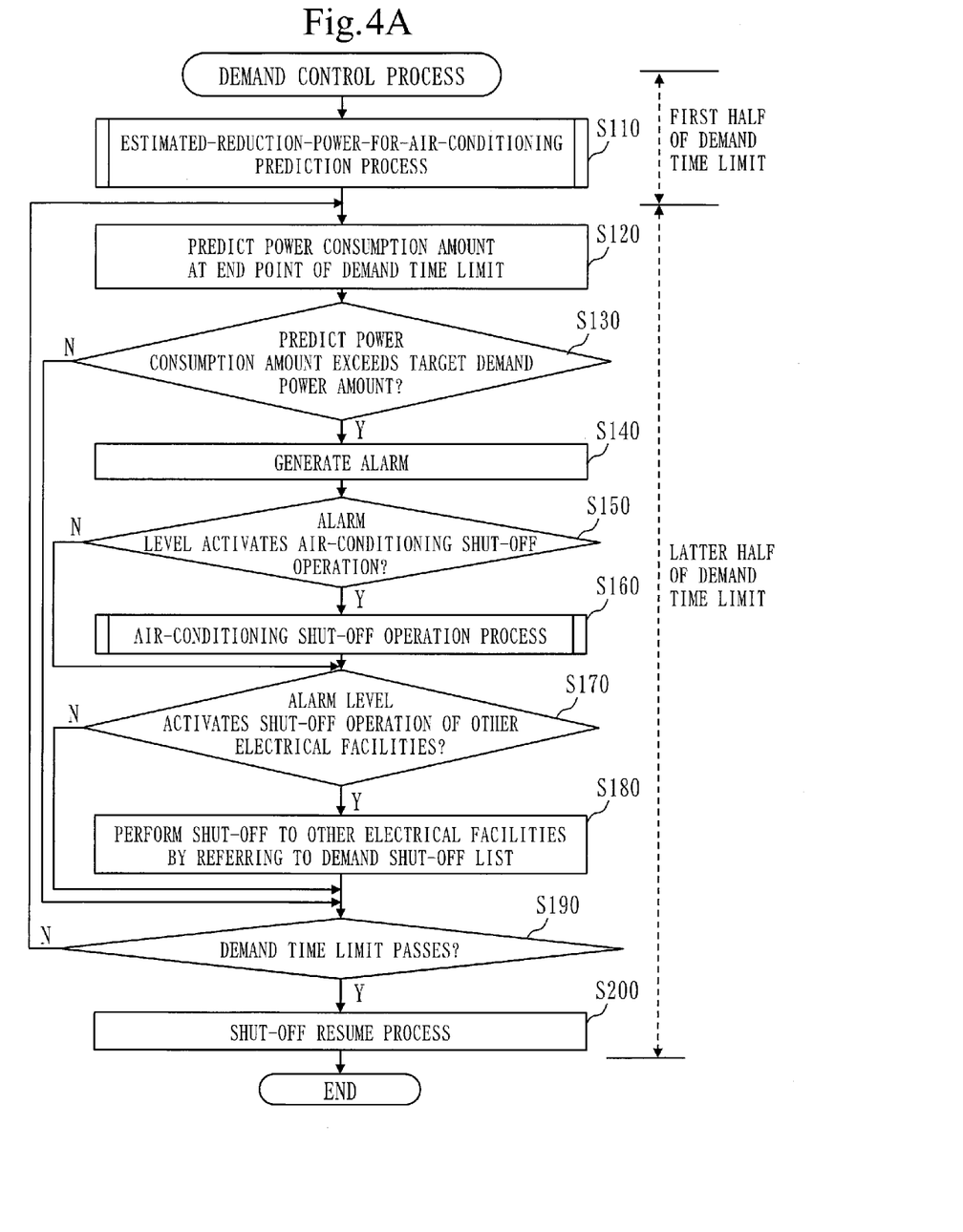
FIG. 4A is a flowchart illustrating a demand control process in the first embodiment.

Next, a demand control process in the present embodiment will be described using the flowcharts illustrated in FIGS. 4A to 4C. In the present embodiment, although the case where a demand time limit is 30 minutes is exemplified, the demand time limit is not limited to 30 minutes. Furthermore, in the present embodiment, the description is based on the assumption that the power consumption amount in which the average power consumption in the demand time limit does not exceed the maximum demand power (demand value) is the target demand power amount. Note that, the target demand power is the power value calculated by dividing the target demand power amount by the demand time limit.

In an air-conditioning control process included in the demand control process in the present embodiment, first in order to perform the air-conditioning control so as not to exceed the target demand power in each demand time limit, an estimated-reduction-power-for-air-conditioning prediction process in which reducible power in the air-conditioning facility is estimated is performed (step 110). The process will be described using FIGS. 4B and 5.

In the air-conditioning control process in the present embodiment, in order to perform the air-conditioning control so as not to exceed the target demand power in each demand time limit, each group performs the shut-off operation (low power operation) for a predetermined shut-off unit time (measurement unit time) in the predetermined measurement period from the start point of the demand time limit, and the power amount reduced during the period is recorded as the reducible power amount of the group. The process will be detailedly described with reference to FIG. 5. Note that, although the contents of the process to estimate reducible power in step 115 of FIG. 4B is changed according to whether the wattmeter is attached, with respect to the other processes, the same processes may be performed to each group, and the group A1 will be focused and described here.

Figure 5:
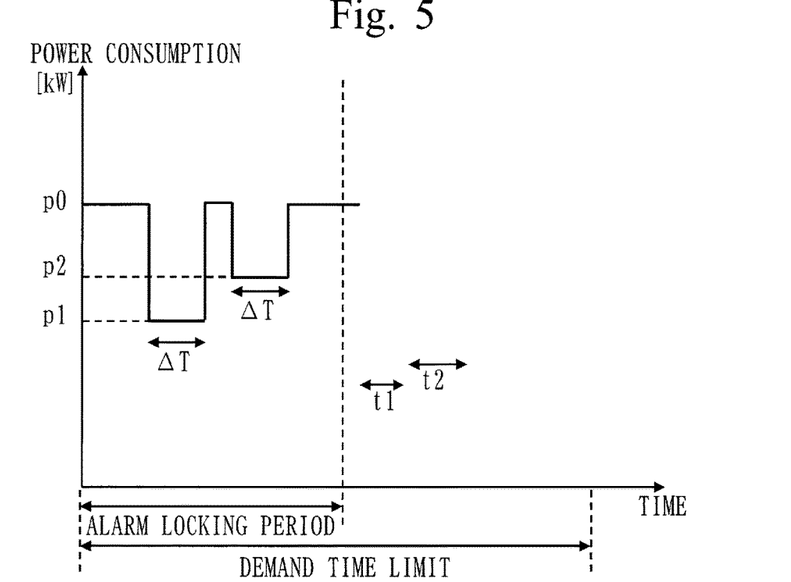
FIG. 5 is a diagram illustrating transitions of power consumption when a shut-off operation is performed in the first half of a demand time limit in the first embodiment.

FIG. 5 illustrates the power consumption of the groups A1 and A2 in the demand time limit. The power consumption amount prediction unit 34 continuously runs and periodically predicts the power consumption amount at the end point of the demand time limit from the increasing power consumption amount at very short time in the demand time limit. The demand control management unit 36 performs the action control so that alarm means, which is not illustrated, outputs an alarm when the power consumption amount predicted by the power consumption amount prediction unit 34 at the end point of the demand time limit exceeds the target demand power amount. However, the alarm action is controlled so as to prevent the alarm at the beginning of the demand time limit. The alarm locking period in FIG. 5 is a period in which the alarm is prevented, and the above described predetermined measurement period is related to the alarm locking period in the present embodiment. In the present embodiment, the predetermined measurement period is set for 15 minutes in the first half of the demand time limit. Obviously, the period is not necessarily limited to 15 minutes and may be extended or shortened appropriately according to the number of groups or the like. Furthermore, the predetermined measurement period may be set separately from the alarm locking period. In the alarm locking period set in the first half of the demand time limit, the next estimated-reduction-power-for-air-conditioning prediction process is performed in the present embodiment.

The demand control management unit 36 determines whether a performance condition of the prediction process has been established first. The performance condition of the prediction process is the case where, for example, the demand time limit is set to a period of time in which the target demand power amount is not obviously exceeded, and the like. Note that, it is not necessary to perform this process in the latter half of the demand time limit.

When the performance condition of the prediction process has not been established (N in step 111), the demand control management unit 36 terminates the process. When the performance condition of the prediction process has been established (Y in step 111), the demand control management unit 36 specifies the group set as a shut-off operation target by referring to a shut-off target group list in which the shut-off target group is set (step 112). Note that, the air-conditioning facility information may include information indicating whether the group is set as the shut-off operation target. Here, the following description is based on the assumption that the groups A1, A2, B1, and B2 illustrated in FIG. 1 have been specified. When specifying the shut-off target group, the demand control management unit 36 sequentially performs the following processes to each group.

Note that, when all of the groups are to be the shut-off operation targets, the process in step 112 may be the process to specify a group which is the estimation process target of the reducible power amount in step 115. In this case, with respect to the reducible power amount of the group which is not specified as the target of the reducible-power-amount estimation process in step 112, for example, a result of the reducible-power-amount estimation process which has been performed in the past is recorded in a log file, and the reducible power amount (for example, a recent process result) of the group may be read from the log file, set as an initial value, and recorded in the air-conditioning facility information storage unit 37.

When selecting any one of groups to which the process has not been performed (step 113), the demand control management unit 36 instructs the air-conditioning controller 4 to make the group perform the shut-off operation for the minimum shut-off time ($\Delta T$). The air-conditioning controller 4 makes, according to the instruction, the indoor unit 7 which belongs to the instructed group perform the shut-off operation and then resume (step 114). The minimum shut-off time ($\Delta T$) is a minimum time required for the indoor unit 7 to resume after temporarily suspending it. In the present embodiment, the shut-off operation means that, as described above, (the groups of) the indoor units 7 operate with low load (low power) by performing a suspending operation or an air blowing operation, and the like. Note that, the low load (low power) operation is not necessarily limited to the operation in which the indoor unit 7 is completely suspended, and includes an operation in which the indoor unit 7 operates with lower power than normal power by turning a thermostat off or changing a temperature.

The example of the power consumption illustrated in FIG. 5 indicates that when the power consumption is $p0$ during a normal action of the group A1, the power consumption is reduced to $p1$ at the time when indoor units A11 and A12 which belong to the group A1 are suspended. Since the power data collection unit 32 successively collects the power consumption measured by the power consumption measurement unit 5 attached to the outdoor unit A, the reducible-power-amount estimation unit 361 recognizes that the power consumption is reduced from $p0$ to $p1$ at the time when the indoor units A11 and A12, which belong to the group A1, are suspended by receiving the power consumption collected by the power data collection unit 32. In other words, the reducible-power-amount estimation unit 361 can calculate the power amount reduced during the group A1 performs the shut-off operation by multiplying the reducible power ($p0-p1$) by the minimum shut-off time ($\Delta T$), that is, the expression ($p0-p1$)$\times\Delta T$. In the present embodiment, the power amount obtained by the above calculation is estimated as the reducible power amount of the group A1, and written and recorded in the air-conditioning facility information storage unit 37 (step 115).

Note that, although FIG. 5 illustrates that the power consumption during the normal action is fixed to $p0$ for convenience of explanation, it can be slightly increased or decreased strictly. Thus, the power consumption immediately before or immediately after, or the average value of the power consumption immediately before and immediately after the group performs the shut-off operation may be $p0$. Alternatively, the power consumption at the start point of the demand time limit may be $p0$, or the average value of the power consumption when the shut-off operation is not performed in the alarm locking period may be $p0$.

When there is a group whose reducible power amount has not been estimated among the groups specified in step 112 (N in step 116), the demand control management unit 36 estimates the reducible power amount of the group. In this example, the reducible power amount of the group A2 is to be estimated. After the indoor units A11 and A12 which belong to the group A1 resume the normal operation, the demand control management unit 36 makes indoor units A21 and A22 which belong to the group A2 perform the shut-off operation by suspending them similarly to the above, and then resume (step 114). Then, the reducible-power-amount estimation unit 361 recognizes that the power consumption is reduced from $p0$ to $p2$ at the time when the group A2 performs the shut-off operation by receiving the power consumption collected by the power data collection unit 32, and estimates the reducible power amount of the group A2 with the expression ($p0-p2$)$\times\Delta T$ (step 115).

In the above described manner, the reducible power amounts of the groups A1 and A2 are calculated. Note that, the difference between $p1$ and $p2$ may occur due to the number of persons in a room and the like as well as the performance of the air-conditioning facility. In the present embodiment, the reducible power amounts of the groups B1 and B2 are calculated next. However, the power consumption measurement unit 5 is not attached to the outdoor unit B. Thus, when the power consumption measurement unit 5 is not attached, the reducible power amount of each group is calculated in the following manner.

Figure 6:
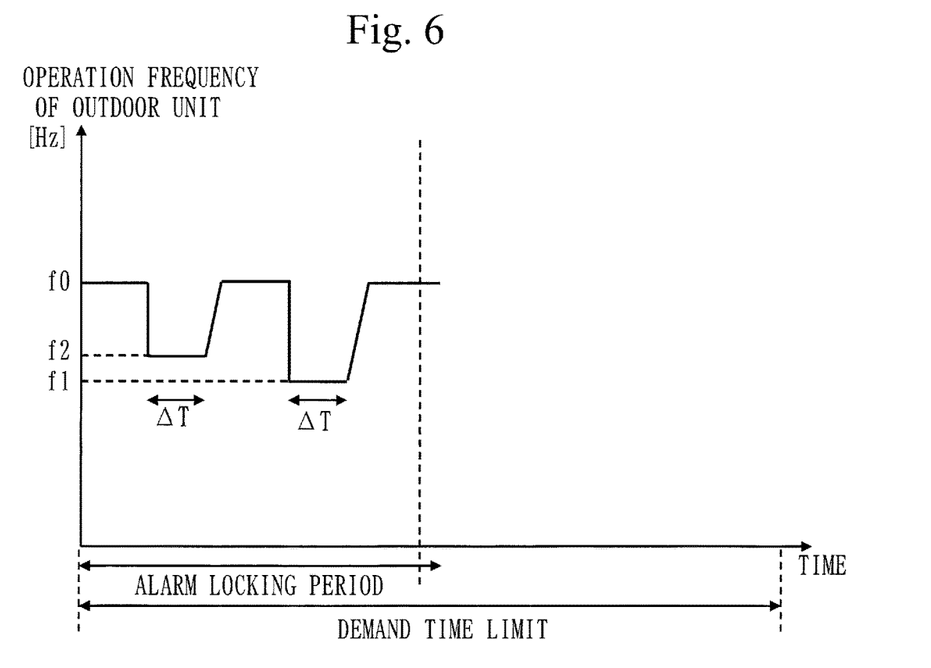
FIG. 6 is a diagram illustrating transitions of an operation frequency of an outdoor unit when the shut-off operation is performed in the first half of the demand time limit in the first embodiment.

The air-conditioning controller 4 makes, according to the instruction from the demand control management unit 36, the indoor unit 7, which belongs to the group B1 instructed similar to the above, perform the shut-off operation (step 114). Here, the group B1 will be focused and described. Incidentally, the air-conditioning controller 4 continuously collects the operation frequency of each outdoor unit 6. FIG. 6 illustrates the transitions of the collected operation frequency of the outdoor unit B in the demand time limit. The example of the operation frequency of the outdoor unit in FIG. 6 illustrates that when the operation frequency of the outdoor unit B during a normal action is $f0$, the operation frequency is reduced to $f1$ at the time when indoor units B11 and B12 which belong to the group B1 are suspended. Since the frequency data collection unit 33 successively collects the operation frequency collected by the air-conditioning controller 4, the reducible-power-amount estimation unit 361 recognizes that the frequency is reduced from $f0$ to $f1$ at the time when the indoor units B11 and B12 which belong to the group B1 are suspended by receiving the operation frequency collected by the frequency data collection unit 33.

Figure 7:
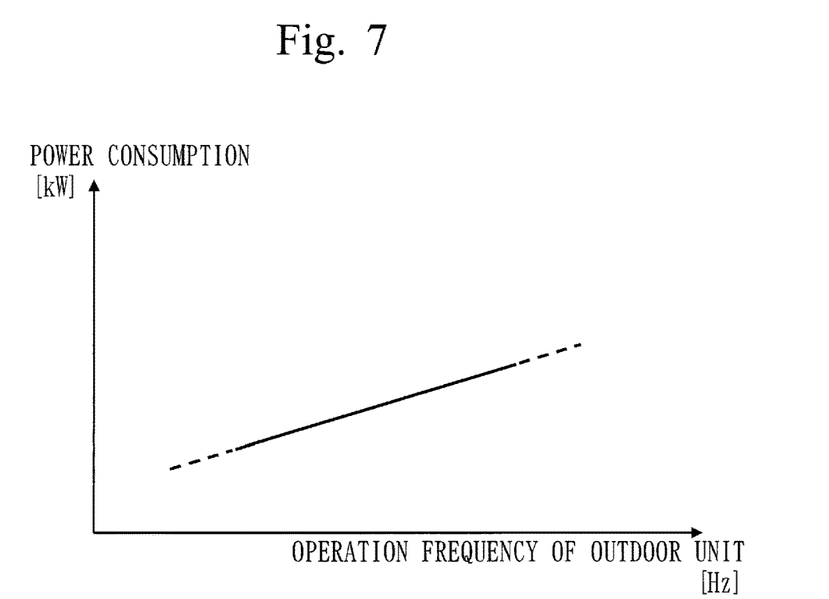
FIG. 7 is a diagram illustrating an approximation model indicating a relation between the operation frequency and power of the outdoor unit in the first embodiment.

Incidentally, generally, a linear approximation model relation is roughly established between the operation frequency and the power consumption of the inverter type outdoor unit 6 as illustrated in FIG. 7. Thus, by referring to the correlation model between the operation frequency and the power consumption, it is possible to convert the data of the operation frequency illustrated in FIG. 6 into the power consumption. The frequency characteristics information indicating the relation between the operation frequency and the power consumption illustrated in FIG. 7 is prepared for each outdoor unit 6, and registered in the frequency characteristics information storage unit 38 in advance. The frequency characteristics information may be generated from the past actual result information, or may be generated using the catalogue value of the outdoor unit 6. When the graph is changed according to thermal load, a plurality of graphs corresponding to the thermal load, such as an outside air temperature, may be prepared for each outdoor unit 6.

Figure 8:
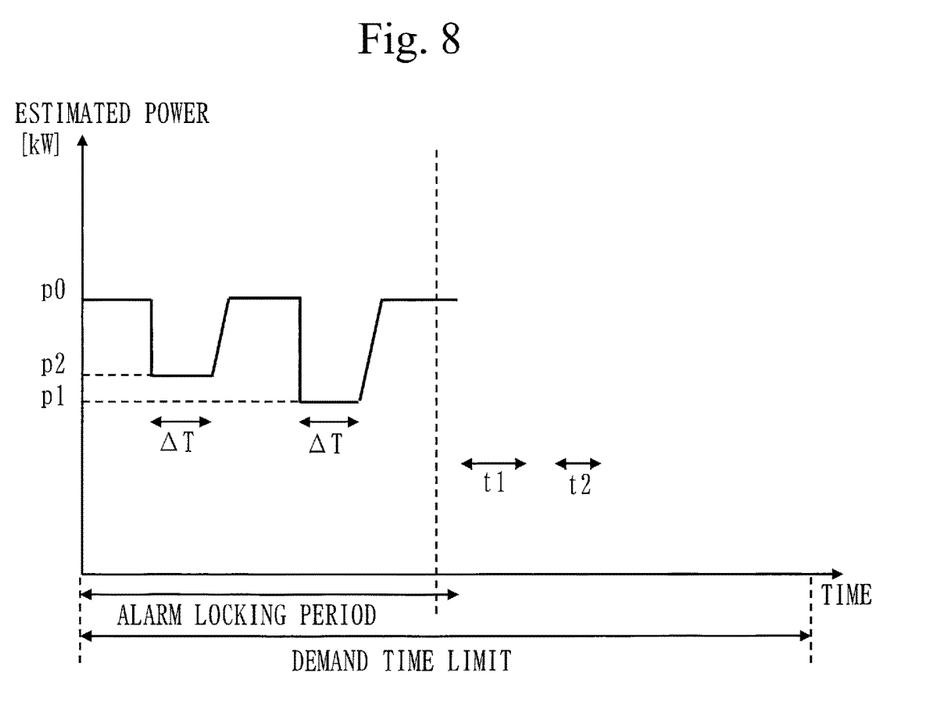
FIG. 8 is a diagram illustrating power predicted using the frequency of the outdoor unit in the approximation model of FIG. 7 when the shut-off operation is performed in the first half of the demand time limit in the first embodiment.

The reducible-power-amount estimation unit 361 converts the operation frequency data collected by the frequency data collection unit 33 into the power consumption by referring to the frequency characteristics registered in the frequency characteristics information storage unit 38. As a result, the transitions of the power consumption in the demand time limit can be obtained. The power consumption obtained in the above manner is illustrated in FIG. 8. FIG. 8 is a diagram corresponding to FIG. 5 obtained from the power consumption measured by the power consumption measurement unit 5, and illustrates the power consumption of the groups B1 and B2. As a result, in the groups B1 and B2 corresponding to the outdoor unit B to which the power consumption measurement unit 5 is not attached, the reducible power amounts of the groups B1 and B2 can be estimated similarly to the groups A1 and A2 corresponding to the outdoor unit A to which the power consumption measurement unit 5 is attached (step 115).

As described above, the reducible power amount can be calculated based on the power consumption obtained by the measurement by the power consumption measurement unit 5 when the power consumption measurement unit 5 is attached to the outdoor unit 6, and the reducible power amount can also be estimated based on the operation frequency of the outdoor unit 6 although the power consumption measurement unit 5 is not attached to the outdoor unit 6.

Note that, since the demand control management unit 36 estimates, for each group, the above described reducible power amount, the shut-off operation to each group is not performed overlapping with each other.

The power consumption amount prediction unit 34, which continuously predicts the power consumption amount at the end point of the demand time limit, predicts the power consumption amount at the time when the first half of the demand time limit passes (step 120), and the demand control management unit 36 confirms whether the power consumption amount predicted by the power consumption amount prediction unit 34 exceeds the target demand power amount in the alarm locking release period after the first half of the demand time limit passes. When it is predicted that the power consumption amount does not exceed the target demand power amount (N in step 130), the demand control management unit 36 leaves the air-conditioning facility operating continuously.

On the other hand, when it is predicted that the power consumption amount at the end point of the demand time limit exceeds the target demand power amount (Y in step 130), the exceeding power amount becomes the reduced power amount target value, and the demand control management unit 36 generates an alarm with alarm means, which is not illustrated, at this time (step 140). Then, when the alarm level specified from the power amount exceeding the target demand power amount is a level which activates the air-conditioning shut-off operation (Y in step 150), an air-conditioning shut-off operation process is performed (step 160). The air-conditioning shut-off operation process will be described with reference to FIG. 4C.

When the reduction operation has been previously scheduled in the demand time limit (Y in step 161), the process proceeds to step 166, and the shut-off operation is to be performed according to the schedule. On the other hand, when there is no previously scheduled reduction operation (N in step 161), the reduced-power-amount determination unit 362 calculates the target reduced power amount for the air-conditioning (a target-reduced-power-for-air-conditioning amount) (step 162). The power amount by which the predicted power consumption amount at the end point of the demand time limit exceeds the target demand power amount becomes the reduced power amount target value, and in the target value, the target reduced power amount for the air-conditioning in the whole electrical facilities is set according to a predetermined rule. Next, the reduced-power-amount determination unit 362 calculates the target reduced power amount of each group from the target-reduced-power-for-air-conditioning amount (step 163). Although the target reduced power amount of each group is calculated by dividing the target-reduced-power-for-air-conditioning amount by the number of groups in the present embodiment, the calculation method does not need to be limited to this. Next, the reduced-power-amount determination unit 362 calculates the shut-off time of each group by dividing the target reduced power amount of each group by the estimation reduction power of the group (step 164).

For example, it is assumed that the target-reduced-power-for-air-conditioning amount is P[kWh], since the target-reduced-power-for-air-conditioning amount is evenly distributed to each group in the present embodiment, the expression $P/n=(p0-p1)\times t1=(p0-p2)\times t2$ is established in the case of the groups A1 and A2. Here, $(p0-p1)$ and $(p0-p2)$ are respectively the reducible powers of the groups A1 and A2 quantified in step 110, and t1 and t2 are respectively the shut-off times of the groups A1 and A2 as illustrated in FIG. 5. Furthermore, n indicates the number of groups, and is four of the groups A1, A2, B1, and B2 in this example.

Thus, the shut-off times t1 and t2 of the groups A1 and A2 can be calculated as $t1=P/(n(p0-p1))$ $t2=P/(n(p0-p2))$ respectively. The shut-off time can be similarly calculated for each of the groups B1 and B2.

In the above described manner, when the shut-off time of each group is calculated, the demand control management unit 36 schedules the shut-off operation by determining a shut-off time in which each group performs the shut-off operation for the shut-off time (step 165).

When the shut-off operation is scheduled in the above manner, the demand control management unit 36 makes each group perform, according to the schedule, the shut-off operation for the shut-off time of the group until the demand time limit passes in the latter half of the demand time limit by instructing the air-conditioning controller 4 (Y in step 166, and step 167). Note that, when the shut-off operation has not been scheduled (N in step 166), the shut-off operation does not need to be performed. In the present embodiment, each group performs the shut-off operation so as not to overlap with each other as exemplified in FIG. 5. However, when the shut-off operation cannot be scheduled so as not to overlap with each other, the overlapping is permitted. Then, the demand control management unit 36 manages the performance by changing the state of the group which performs the shut-off operation to "performed" (step 168).

In the present embodiment, by making each group perform in order the low power operation by the shut-off operation for the shut-off time calculated for each group in the above described manner, the air-conditioning control is performed so that the power consumption amount in the demand time limit does not exceed the target demand power amount.

Next, when the alarm level is a level which activates the shut-off operation of the other electrical facilities (Y in step 170), the demand control management unit 36 performs the shut-off to the corresponding other electrical facilities by referring to the demand shut-off list 40 (step 180).

The above processes are repeatedly performed until the demand time limit passes (N in step 190). Then, when the demand time limit has passed (Y in step 190), the demand control management unit 36 performs a resume process to return the shut-off facility back to its original state (step 200).

Incidentally, when the target-reduced-power-for-air-conditioning amount is evenly distributed to the groups A1 and A2 and the relation (p0−p1)>(p0−p2) in the reducible power is established, the relation t1<t2 in the shut-off time can be established. In other words, the group having smaller reducible power takes longer time to perform the shut-off operation. It is predicted that the thermal load of the group having larger power consumption (the group A1 in the above example) is high. Thus, when such a group performs the shut-off operation for a relatively long time, the room temperature raises, and the uncomfortableness degree can be relatively large. On the other hand, it is predicted that the thermal load of the group having smaller power consumption (the group A2 in the above example) is low. Thus, when such a group performs the shut-off operation for a relatively long time, the raising degree of the room temperature is small, and the uncomfortableness degree can be relatively small. Thus, in the present embodiment, in order for the shut-off operation time of the group having low thermal load to become relatively longer whereas the shut-off operation time of the group having high thermal load becomes shorter, the target-reduced-power-for-air-conditioning amount is evenly distributed to each group. In the above described manner, in the present embodiment, while deterioration of a living space environment is minimized by preventing deterioration of comfortableness of the living space, the air-conditioning control in the low power operation is performed so as not to exceed the target demand power amount. Naturally, it is only required to reduce the power consumption amount as a whole of the air-conditioning facility, the target-reduced-power-for-air-conditioning amount is not necessarily evenly distributed to each group.

According to the present embodiment, since the target reduced power amount is distributed by referring to an external environment, such as an outside air temperature, in the demand time limit, it is possible to improve the accuracy of the operation control of the air-conditioning facility so as not to exceed the target demand power amount.

Furthermore, although the air-conditioning control has been performed by the shut-off operation in the latter half of the demand time limit so as not to exceed the target demand power amount, there may be the case where the power is consumed more than expected and the predicted power consumption amount exceeds the target demand power amount again. In this case, the power consumption amount exceeding the target demand power amount may be distributed to each group again and perform the shut-off operation. Note that, the confirmation whether the target demand power amount is exceeded may not be performed regularly in the latter half of the demand time limit, but may be performed once a few minutes before the end point.

Furthermore, the target reduced power amount is evenly distributed to the groups according to the previously set distribution criteria in the present embodiment, but is not necessarily evenly distributed as long as different distribution criteria is adopted. For example, distribution rate may be set according to importance of a room (group), such as a living room, or a reception room. In the case of a reception room, the shut-off time may be distributed so as to become much shorter than a living room and the like which has relatively low importance, or the shut-off time of a group having relatively many complaints may be distributed so as to be shorter than a group having less complaints.

Figure 4B:
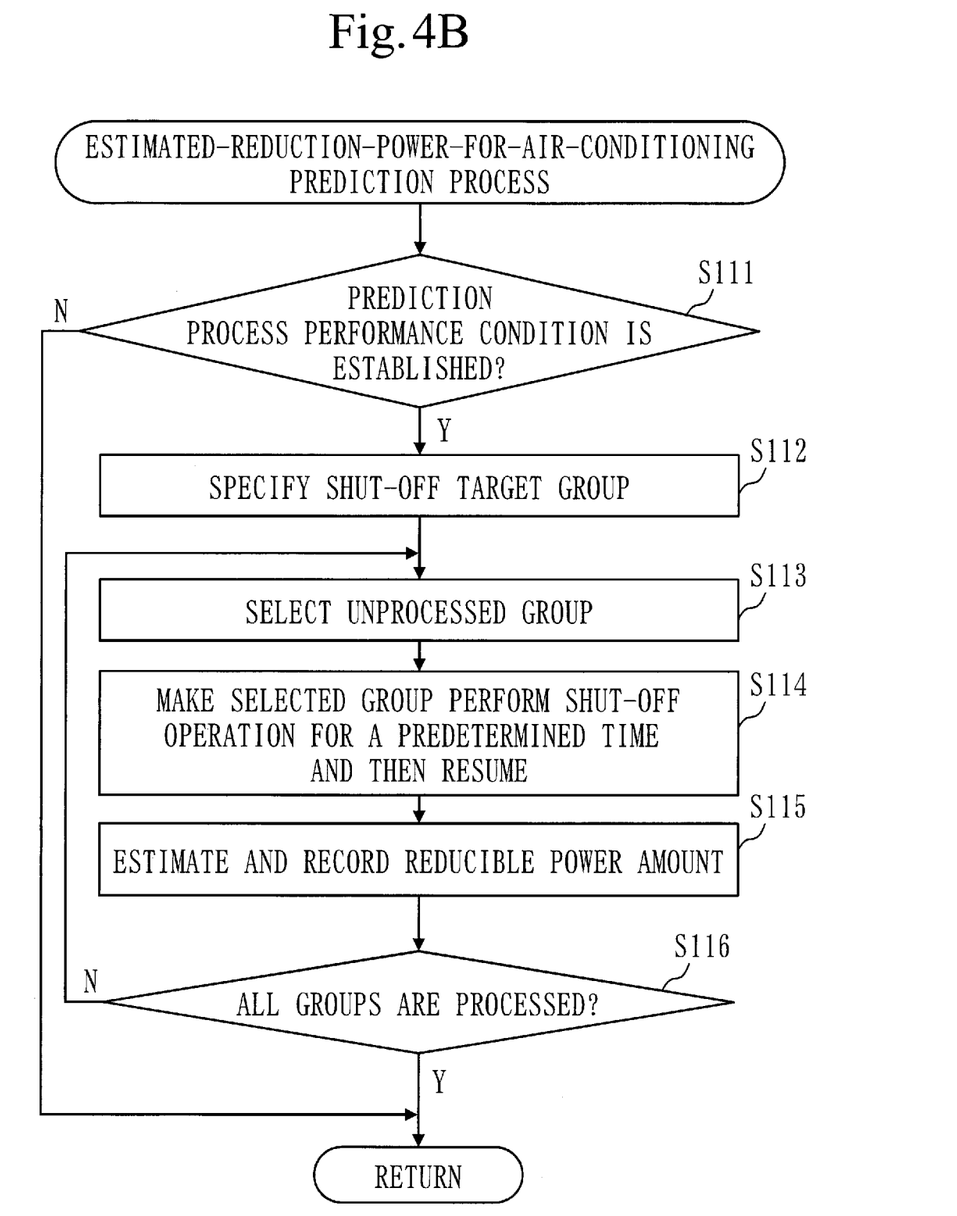
FIG. 4B is a flowchart illustrating an estimated-reduction-power-for-air-conditioning prediction process in the first embodiment.
Figure 4C:
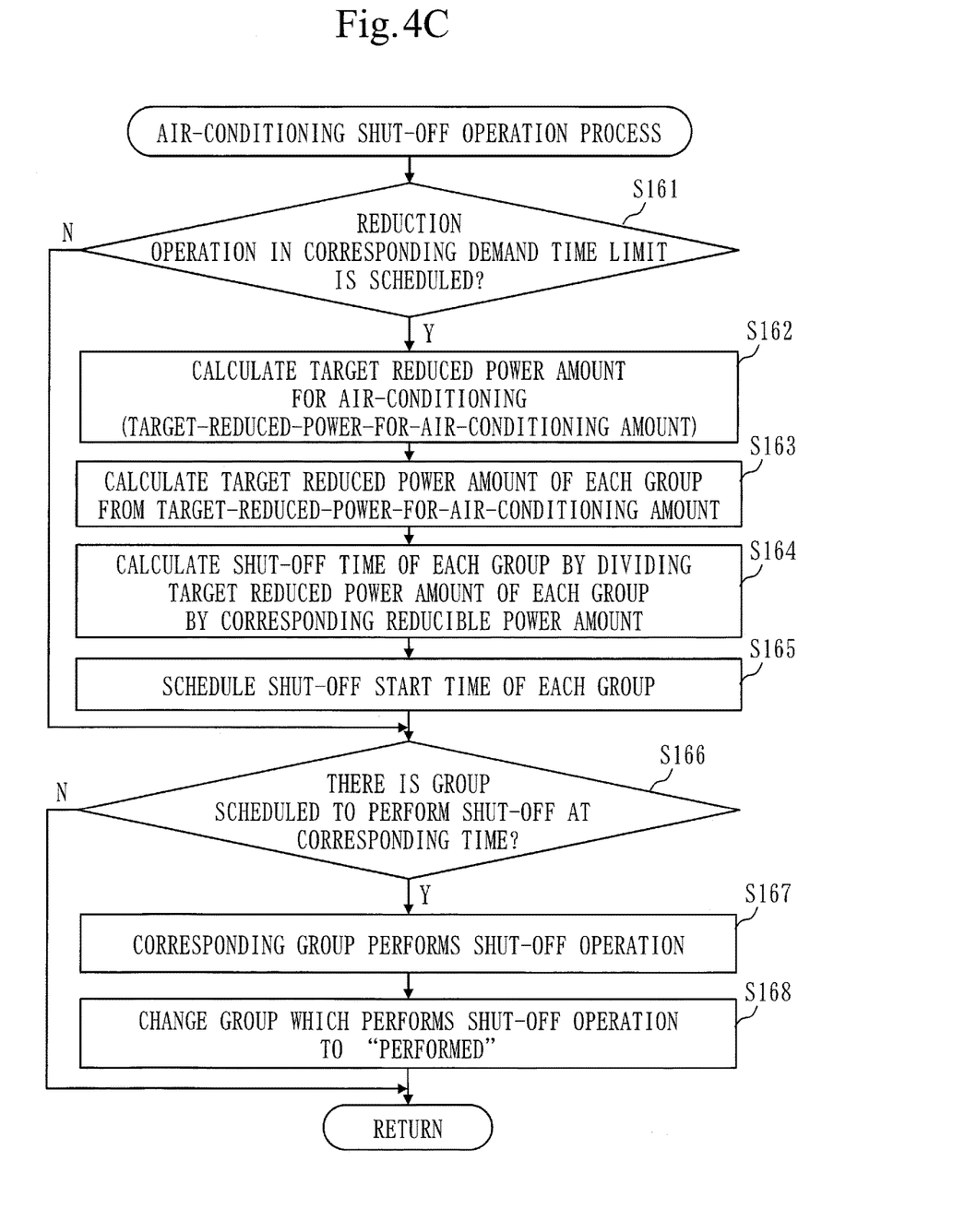
FIG. 4C is a flowchart illustrating an air-conditioning shut-off operation process in the first embodiment.

Furthermore, when it is determined that the maximum demand power is exceeded even after the shut-off operation is performed, a group which is not specified as the shut-off operation target in step 112 of FIG. 4B may be included in the shut-off operation target. In this case, since the reducible-power-amount estimation process (step 115) has not been performed to the group which is not the shut-off operation target, the reducible-power-amount estimation process may be performed to the group at the time when the group is included in the shut-off operation target, or a result of the reducible-power-amount estimation process which has been performed in the past is recorded in a log file, and the estimated reducible power amount of the group (for example, a recent process result) may be used as the reducible power amount of the group. If the past log is used, the reducible power amount does not need to be calculated, and it is possible to quickly deal with the process. Furthermore, by referring to the demand shut-off list 40, electrical facilities other than the air-conditioning facility, such as a lighting facility, performs the low power operation, and thus adjustment may be carried out by combining the reduced power amount values of the air-conditioning facility and the lighting facility so as not to exceed the maximum demand power accordingly.

Note that, as a technique in order for an air-conditioning facility to operate with low power, the intermittent shut-off operation in which (groups of) the indoor units 7 operate with low load (low power) by performing a suspending operation or an air blowing operation and the like has been exemplified in the present embodiment, if there are other operation methods, for example, to completely suspend the operation of the air-conditioning facility, such methods may be used.

The above described modification examples are also applicable to the embodiment to be described below.

Second Embodiment

As illustrated in FIG. 1, indoor units A11 and A12 are grouped into a group A1, indoor units A21 and A22 are grouped into a group A2, and the groups A1 and A2 are allocated to a zone A. Furthermore, indoor units B11 and B12 are grouped into a group B1, indoor units B21 and B22 are grouped into a group B2, and the groups B1 and B2 are allocated to a zone B. As described above, when indoor units 7 are grouped into a plurality of groups based on the installation place and the groups are allocated to either of a plurality of areas, the present embodiment is characterized in that the area (zone) is taken into account and a shut-off time of each group is to be calculated.

Figure 9:
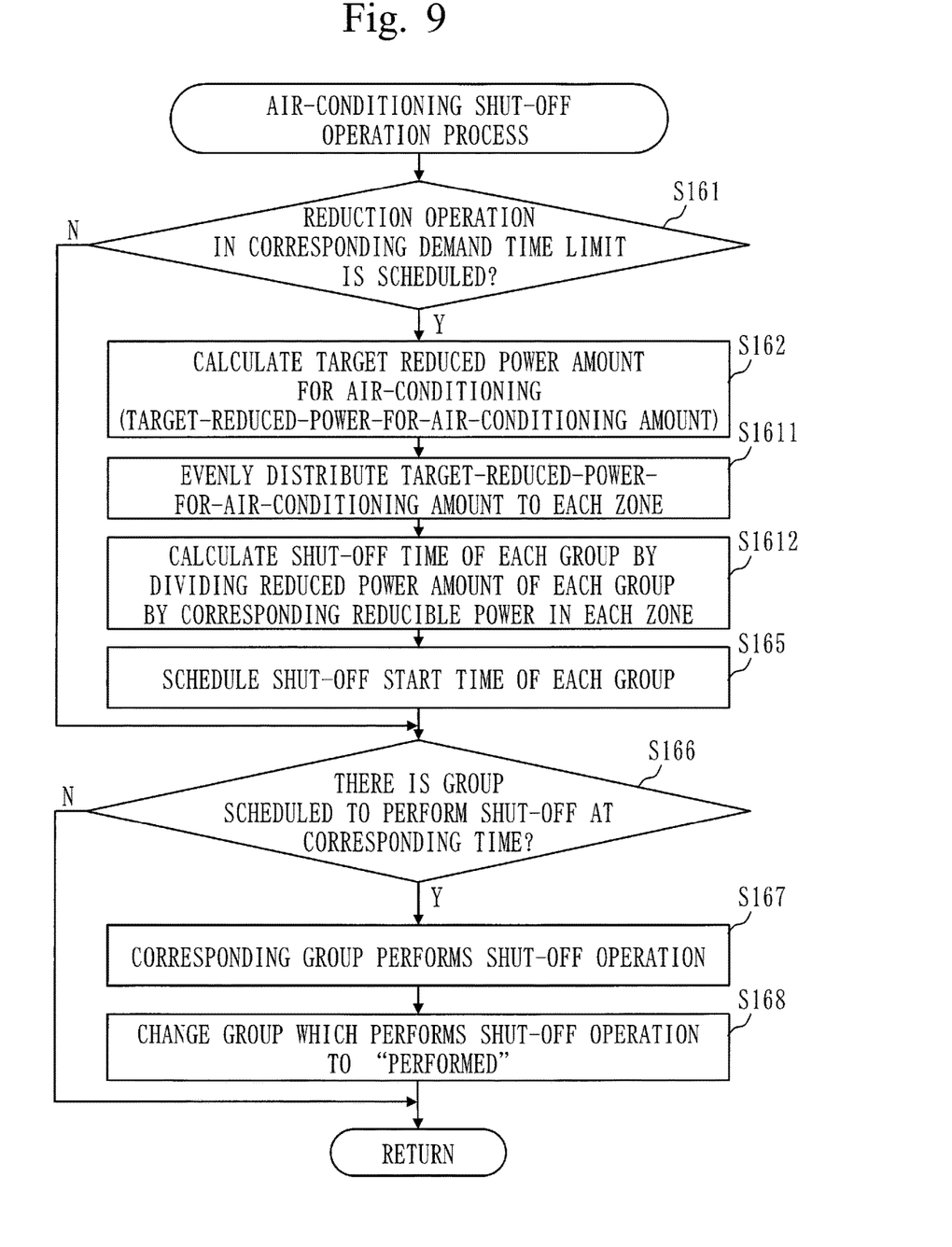
FIG. 9 is a flowchart illustrating an air-conditioning shut-off operation process in a second embodiment.

Note that, the configuration of the present embodiment may be the same as that of the first embodiment, and since in the process in the present embodiment when the shut-off time of each group is calculated in a demand control process, only the air-conditioning shut-off operation process is different from the process described in the first embodiment and illustrated in FIG. 4C, the air-conditioning shut-off operation process will be described with reference to FIG. 9. Note that, the same step numbers are assigned to the processes which are the same as that in FIG. 4C used in the first embodiment, and the description will be appropriately omitted.

When a reduction operation has been previously scheduled in the demand time limit (Y in step 161), the process proceeds to step 166 and the shut-off operation is to be performed according to the schedule. On the other hand, when there is no previously scheduled reduction operation (N in step 161), the reduced-power-amount determination unit 362 calculates the target reduced power amount for the air-conditioning (a target-reduced-power-for-air-conditioning amount) (step 162). The power amount by which the predicted power consumption amount at the end point of the demand time limit exceeds the target demand power amount becomes the reduced power amount target value, and in the target value, the target reduced power amount for the air-conditioning in the whole electrical facilities is set according to a predetermined rule. Next, the reduced-power-amount determination unit 362 evenly distributes the target-reduced-power-for-air-conditioning amount to each zone (step 1611). The target is to be achieved by further distributing, to each group in each zone, the reduced power amount distributed (hereinafter, a "target-for-each-zone value") from the present point to the end point of the demand time limit in each zone, and the reduced-power-amount determination unit 362 in the present embodiment obtains the shut-off time of each group by evenly distributing the target-for-each-zone value to each group and schedules them.

For example, it is assumed that the target-for-each-zone value is Q[kWh] in the zone A, the expression $Q=(p0-p1)\times t1+(p0-p2)\times t2$ is established. Here, $(p0-p1)$ and $(p0-p2)$ are respectively the reducible powers of the groups A1 and A2 quantified in step 110, and t1 and t2 are respectively the shut-off times of the groups A1 and A2 as illustrated in FIG. 5.

In the present embodiment, since the target-for-each-zone value Q is evenly distributed to the groups A1 and A2, the expression $(p0-p1)\times t1=(p0-p2)\times t2=Q/n$ is established. The letter n indicates the number of groups included in the zone.

Thus, the shut-off times t1 and t2 of the groups A1 and A2 can be calculated as $t1=Q/(n(p0-p1))$, and $t2=Q/(n(p0-p2))$ respectively. The shut-off time can be similarly calculated for each of the groups B1 and B2 (step 1612).

As described above, the reduced-power-amount determination unit 362 in the present embodiment evenly distributes the target-reduced-power-for-air-conditioning amount to each zone and the reduced power amount distributed (target-for-each-zone value) to each group included in the zone, and calculates the shut-off time based on the reducible power of the group.

The subsequent processes are the same as those in the first embodiment and the description thereof will be omitted.

Note that, in the above description, the target-reduced-power-for-air-conditioning amount is evenly distributed to each zone when the reduced power amount for each group is determined, but is not necessarily evenly distributed. For example, according to the ratio of the number of the indoor units 7 connected with the outdoor unit 6, larger target-reduced-power-for-air-conditioning amount may be distributed to the group having larger number of the indoor units 7. Alternatively, thermal load may be taken into consideration. For example, when a solar radiation amount or an outside air temperature is taken into consideration, it can be predicted that the thermal load on the air-conditioning facility installed in a zone at a south side of the building is larger than the thermal load on the air-conditioning facility installed in a zone at a north side of the building. Thus, the target-reduced-power-for-air-conditioning amount is distributed so that the reduced power amount distributed to the zone having relatively high thermal load becomes smaller. Specifically, when the environmental information collection unit 31 collects the environmental information measured by the environmental information measurement unit 3 at the present point, the reduced-power-amount determination unit 362 specifies, referring to the actual result information, that each zone consume how much power when the outside air temperature is, for example, 30° C., and the target-reduced-power-for-air-conditioning amount may be distributed according to the power consumption ratio so that the power amount to be distributed to the zone having larger power consumption amount becomes smaller.

REFERENCE SIGNS LIST

1: network, 2: watthour meter, 3: environmental information measurement unit, 4: air-conditioning controller, 5: power consumption measurement unit, 6: outdoor unit, 7: indoor unit, 8: lighting controller, 9: other electrical facilities, 11: CPU, 12: ROM, 13: RAM, 14: hard disk drive (HDD), 15: HDD controller, 16: mouse, 17: keyboard, 18: display, 19: input/output controller, 20: network controller, 21: internal bus, 30: demand control device, 31: environmental information collection unit, 32: power data collection unit, 33: frequency data collection unit, 34: power consumption amount prediction unit, 35: information transmission unit, 36: demand control management unit, 37: air-conditioning facility information storage unit, 38: frequency characteristics information storage unit, 39: actual result information storage unit, 40: demand shut-off list, 81: lighting, 361: reducible-power-amount estimation unit, and 362: reduced-power-amount determination unit

The invention claimed is:

1. A demand control device that causes an air-conditioning controller to perform low power operation control to make air-conditioning groups to which one or more indoor units belong perform a low power operation on a per-group basis, where a low power operation is an operation which consumes less power than a cooling operation, the device comprising:
    a memory; and
    a processor configured to
        estimate a reducible power amount of the air-conditioning groups from a power amount reduced when each group separately performs the low power operation for a predetermined measurement unit time in a predetermined measurement period from a start point of a demand time limit;
        predict a power consumption amount of the demand time limit;
        calculate, when the predicted power consumption amount exceeds a target demand power amount previously set to the demand time limit, a power amount to be reduced in order not to exceed the target demand power amount as a target reduced power amount;
        distribute the target reduced power amount to each group according to previously set distribution criteria; and
        calculate, for each group, a low power operation time to reduce the target reduced power amount distributed for each group based on the estimated reducible power,
    wherein the air-conditioning controller makes the air-conditioning groups perform the low power operation for the low power operation time calculated for each group wherein the processor distributes, when the indoor units are grouped into a plurality of groups based on an installation place and each group is allocated to any one of a plurality of areas, the target reduced power amount to each area,
    distributes, to each group allocated to the area, the target reduced power amount distributed to each area, and calculates, for each group, the low power operation time to reduce the distributed target reduced power amount for each group based on the reducible power.

2. The demand control device according to claim 1, further comprising:
power consumption meter, which is attached to an inverter type outdoor unit connected with the indoor unit which belongs to one or more groups, to measure a power consumption of the outdoor unit,
wherein the processor estimates, based on, when any one of groups performs the low power operation, the power consumption measured by the power consumption meter attached to the outdoor unit connected with the indoor unit which belongs to the group, a reducible power amount of the group.

3. The demand control device according to claim 1, wherein the processor estimates, from, when any one of groups performs the low power operation, operation frequency of a compressor of the outdoor unit connected with the indoor unit which belongs to the group, power consumption of the group, and estimates a reducible power amount of the group based on the estimated power consumption.

4. The demand control device according to claim 3, wherein the processor generates a correlation model based on actual result information on the operation frequency and the power consumption of the compressor, and estimates a power consumption amount of the group from the correlation model.

5. The demand control device according to claim 1, wherein the processor evenly distributes the calculated target reduced power amount to each group according to the previously set distribution criteria.

6. The demand control device according to claim 1, wherein the processor evenly distributes the target reduced power amount to each area.

7. A non-transitory computer readable medium storing a program causing a processor mounted in a demand control device to cause an air-conditioning controller to perform low power operation control to make air-conditioning groups to which one or more indoor units belong perform a low power operation on a per-group basis, where a low power operation is an operation which consumes less power than a cooling operation, the processor configured to:
estimate a reducible power amount of the group from a power amount reduced when each group separately performs the low power operation for a predetermined measurement unit time in a predetermined measurement period from a start point of a demand time limit;
predict a power consumption amount at an end point of the demand time limit;
calculate, when the predicted power consumption amount exceeds a target demand power amount previously set to the demand time limit, a power amount to be reduced in order not to exceed the target demand power amount as a target reduced power amount;
distribute the target reduced power amount to each group according to previously set distribution criteria;
calculate, for each group, a low power operation time to reduce the target reduced power amount distributed for each group based on the reducible power; and
provide the calculated low power operation time to an air-conditioning controller such that the air-conditioning controller controls the group to perform the low power operation for the low power operation time calculated for each group wherein the processor distributes, when the indoor units are grouped into a plurality of groups based on an installation place and each group is allocated to any one of a plurality of areas, the target reduced power amount to each area, distributes, to each group allocated to the area, the target reduced power amount distributed to each area, and calculates, for each group, the low power operation time to reduce the distributed target reduced power amount for each group based on the reducible power.

\* \* \* \* \*